United States Patent
Tang

(10) Patent No.: US 10,325,593 B2
(45) Date of Patent: *Jun. 18, 2019

(54) METHOD AND DEVICE FOR WAKING UP VIA SPEECH BASED ON ARTIFICIAL INTELLIGENCE

(71) Applicant: BAIDU ONLINE NETWORK TECHNOLOGY (BEIJING) CO., LTD., Beijing (CN)

(72) Inventor: Liliang Tang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 140 days.

This patent is subject to a terminal disclaimer.

(21) Appl. No.: 15/624,595

(22) Filed: Jun. 15, 2017

(65) Prior Publication Data

US 2018/0190281 A1   Jul. 5, 2018

(30) Foreign Application Priority Data

Dec. 29, 2016 (CN) .......................... 2016 1 1248513

(51) Int. Cl.
*G10L 17/00* (2013.01)
*G10L 15/22* (2006.01)
*G10L 15/02* (2006.01)
*G10L 15/08* (2006.01)

(52) U.S. Cl.
CPC .............. *G10L 15/22* (2013.01); *G10L 15/02* (2013.01); *G10L 2015/025* (2013.01); *G10L 2015/081* (2013.01); *G10L 2015/088* (2013.01)

(58) Field of Classification Search
USPC ..................... 704/1–10, 230–257, 270–277
See application file for complete search history.

(56) References Cited

U.S. PATENT DOCUMENTS

| 2001/0012994 A1* | 8/2001 | Komori | G10L 15/142 704/231 |
| 2013/0339028 A1* | 12/2013 | Rosner | G10L 15/222 704/275 |
| 2015/0095032 A1* | 4/2015 | Li | G10L 15/08 704/255 |

\* cited by examiner

*Primary Examiner* — Huyen X Vo
(74) *Attorney, Agent, or Firm* — Hodgson Russ LLP

(57) ABSTRACT

A method and a device for waking up via a speech based on artificial intelligence are provided in the present disclosure. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network. Due to the data size for the garbage phones is significantly smaller than the data size for the garbage words, a problem that the data size occupied is too large by using a garbage word model in the prior art is solved. Meanwhile, as a word is composed of several phones, the garbage phones may be more likely to cover all words than the garbage words. Thus, an accuracy of waking up is improved and a probability of false waking up is reduced.

20 Claims, 4 Drawing Sheets

METHOD AND DEVICE FOR WAKING UP VIA SPEECH BASED ON ARTIFICIAL INTELLIGENCE

CROSS-REFERENCE TO RELATED APPLICATIONS

This application is based on and claims a priority to Chinese Patent Application Serial No. 201611248513.X, filed on Dec. 29, 2016, the entire content of which is incorporated herein by reference.

TECHNICAL FIELD

The present disclosure relates to the field of speech recognition technology, and more particularly, to a method and a device for waking up via a speech based on artificial intelligence.

BACKGROUND

Artificial intelligence (AI for short) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

A speech wake-up technology is an important branch of the speech recognition technology. In detail, the speech wake-up technology is to wake up a terminal so as to activate a system of the terminal if a specific wake-up word is spoken by a user when the terminal is standby, such that corresponding operations and serves may be achieved.

In the related art, a decoding network is formed generally by parallel connecting wake-up words and garbage words. Then, a best-matched identified result is found in the decoding network according to acoustic features of an input speech so as to wake up the terminal. When the decoding network is constructed, if the number of Chinese characters selected is too little, a higher accuracy of identifying will not be ensured, while if the number of Chinese characters selected is too much, a data size will be greater, thereby occupying too much memory space and affecting calculation efficiency.

SUMMARY

Embodiments of the present disclosure provide a method for waking up via a speech based on artificial intelligence. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network.

Embodiments of the present disclosure provide a device for waking up via a speech based on artificial intelligence. The device includes: a processor; a memory configured to store instructions executable by the processor; in which, the processor is configured to: cluster phones to select garbage phones for representing the phones; construct an alternative wake-up word approximate to a preset wake-up word according to the preset wake-up word; construct a decoding network according to the garbage phones, the alternative wake-up word and the preset wake-up word; and wake up via the speech by using the decoding network.

Embodiments of the present disclosure provide a non-transitory computer readable storage medium. When instructions stored in the storage medium is executed by a processor of a terminal, a method for waking up via a speech based on artificial intelligence may be executed by the terminal. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network.

Embodiments of the present disclosure provide a computer program product. When instructions in the computer program product are executed by a processor, a method for waking up via a speech is performed. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
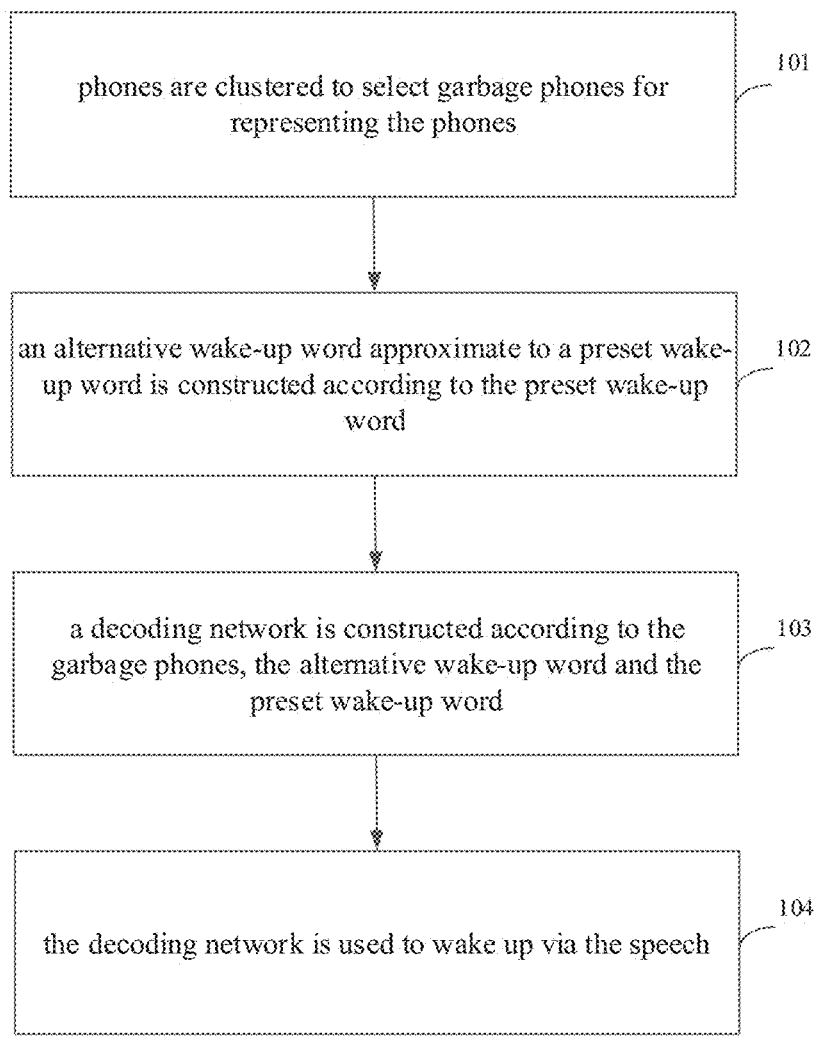
FIG. 1 is a flow chart illustrating a method for waking up via a speech based on artificial intelligence provided in embodiments of the present disclosure.

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for waking up via a speech based on artificial intelligence according to embodiments of the present disclosure will be described with reference to the drawings.

FIG. 1 is a flow chart illustrating a method for waking up via a speech based on artificial intelligence provided in embodiments of the present disclosure.

A decoding network is generally formed by parallel connecting wake-up words and garbage words for waking up in the prior art. When the garbage words are constructed in the related art, if the number of Chinese characters selected is too little, a higher accuracy of identifying will not be ensured, while if the number of Chinese characters selected is too much, a data size will be heavy, memory space occupied is large and calculation efficiency is influenced. For solving above problems, embodiments of the present disclosure provide a method for waking up via a speech based on artificial intelligence. The method may solve a problem that the data size occupied is too large by using a garbage word model in the prior art, when a garbage phone model constructed with garbage phones is used. Meanwhile, an accuracy of waking up is improved and a probability of false waking up is reduced, by representing all speeches by the garbage phones. As illustrated in FIG. 1, the method includes followings.

At act 101, phones are clustered to select garbage phones for representing the phones.

In detail, the phones and states corresponding to the phones are acquired. A target phone is selected from the phones at random, and the target phone is added into a garbage phone set. Starting from the target phone, a phone having a greatest distance from the target phone is inquired among the phones, and the inquired phone is added into the garbage phone set.

The inquired phone is determined as the target phone to circularly execute a process of inquiring the phone having a greatest distance from the target phone among the phones and adding the inquired phone into the garbage phone set, until the number of phones included in the garbage phone set reaches a preset first number.

It is to be illustrated that, the phones and the states corresponding to the phones are acquired based on a statistical model. For example, a Hidden Markov Model (HMM in short) which is generally used for the speech recognition. In the field of the speech recognition, a random sequence with a finite length is generally used in a random process of identifying speeches. The random sequence may be a 1-dimensional observation sequence or a 1-dimensional coded symbol sequence, or may be a multi-dimensional vector sequence. These sequences may be collectively called as an observation sequence. The statistical model with a plurality of states is a probability model, represented by parameters, for describing statistical features of these random sequences. Details of the models may be referred to descriptions related to the speech recognition technology in the related art, which are not elaborated herein.

Figure 2:
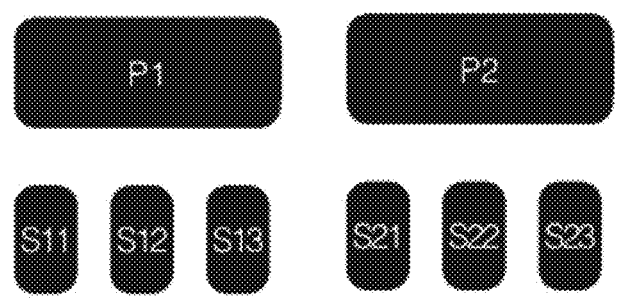
FIG. 2 is a schematic diagram illustrating phones and states corresponding to the phones.

In the embodiment, a case that each phone has 3 states is taken as an example for description. In practice, the number of the states may be changed by skilled in the art as need, which is not limited herein. FIG. 2 is a schematic diagram illustrating phones and states corresponding to the phones. As illustrated in FIGS. 2, P1 and P2 denote two phones. P1 includes three states S11, S12 and S13. Each of the three states of P1 is obtained by fitting with a Gaussian Mixture Model of P1. P2 includes three states S21, S22 and S23. Each of the three states of P2 is obtained by fitting with a Gaussian Mixture Model of P2.

At act 102, an alternative wake-up word approximate to a preset wake-up word is constructed according to the preset wake-up word.

In detail, a near pronunciation word having characters with the number smaller than that in the preset wake-up word is selected from a list of words having similar pronunciation to the preset wake-up word. And the alternative wake-up word may be constructed according to a part of the preset wake-up word and the near pronunciation word.

For example, if the preset wake-up word is "小度你好 (Chinese characters)", the corresponding alternative wake-up word is constructed, such as "小布你", "交度你" and the like, according to the first character (i.e. "小") or the second character (i.e. "度") of the preset wake-up word and the near pronunciation word.

Alternatively, as a possible implementation, the alternative wake-up word may be constructed by followings.

Firstly, the list of words having similar pronunciation to the preset wake-up word is created. The list may be compiled by Chinese professional, or may be referred to dictionaries issued by China.

Then, if the number of characters included in the preset wake-up word is n, for example, the number n of characters included in "小度你好" is four, the near pronunciation words selected from the list may be classified into (n−2) classes according to the number n of characters included in the preset wake-up word. The number of characters included in the near pronunciation word is decreased to 2 from (n−1). For example, in a case that the preset wake-up word is "小度你好", n=4, the near pronunciation word may be classified into 4−2=2 classes (that is, a class of three characters and a class of two characters).

Finally, in each of the 2 classes, no more than 3 near pronunciation words are selected. The alternative wake-up word is generated according to the no more than 3 near pronunciation words and one or more characters included in the preset wake-up word. For example, in a case that the preset wake-up word is "小度你好", three consecutive characters are selected at random as "小度你" or "度你好", and the first character or the last character is kept. The near pronunciation words in the class of three characters may place the rest of the part of the preset wake-up word "小度你" or "度你好" when the first character or the last character of the preset wake-up word is kept. Then, the alternative wake-up word may be obtained, such as "小布你", "度你少", "不你好" and the like.

At 103, a decoding network is constructed according to the garbage phones, the alternative wake-up word and the preset wake-up word.

The decoding network is constructed by parallel connecting the garbage phones, the alternative wake-up word and the preset wake-up word.

At 104, the decoding network is used to wake up via the speech.

In detail, acoustic features of an input speech are extracted. The extracted acoustic features are input into the decoding network and a calculation is performed to obtain an optimal path as an identified result among the decoding network by using a dynamic programming algorithm. And a terminal is waken up according to the identified result.

In the embodiment, by clustering the phones to select the garbage phones for representing the phones, and by constructing the decoding network according to the garbage phones, the alternative wake-up word and the preset wake-up word after the alternative wake-up word approximate to the preset wake-up word is constructed according to the preset wake-up word, the waking up via the speech is performed by using the decoding network. Due to the data size for the garbage phones is significantly smaller than the data size for the garbage words, a problem that the data size occupied is too large by using a garbage word model in the prior art is solved. Meanwhile, as a word is composed of several phones, the garbage phones may be more likely to cover all words than the garbage words. Thus, an accuracy of waking up is improved and a probability of false waking up is reduced.

Figure 3:
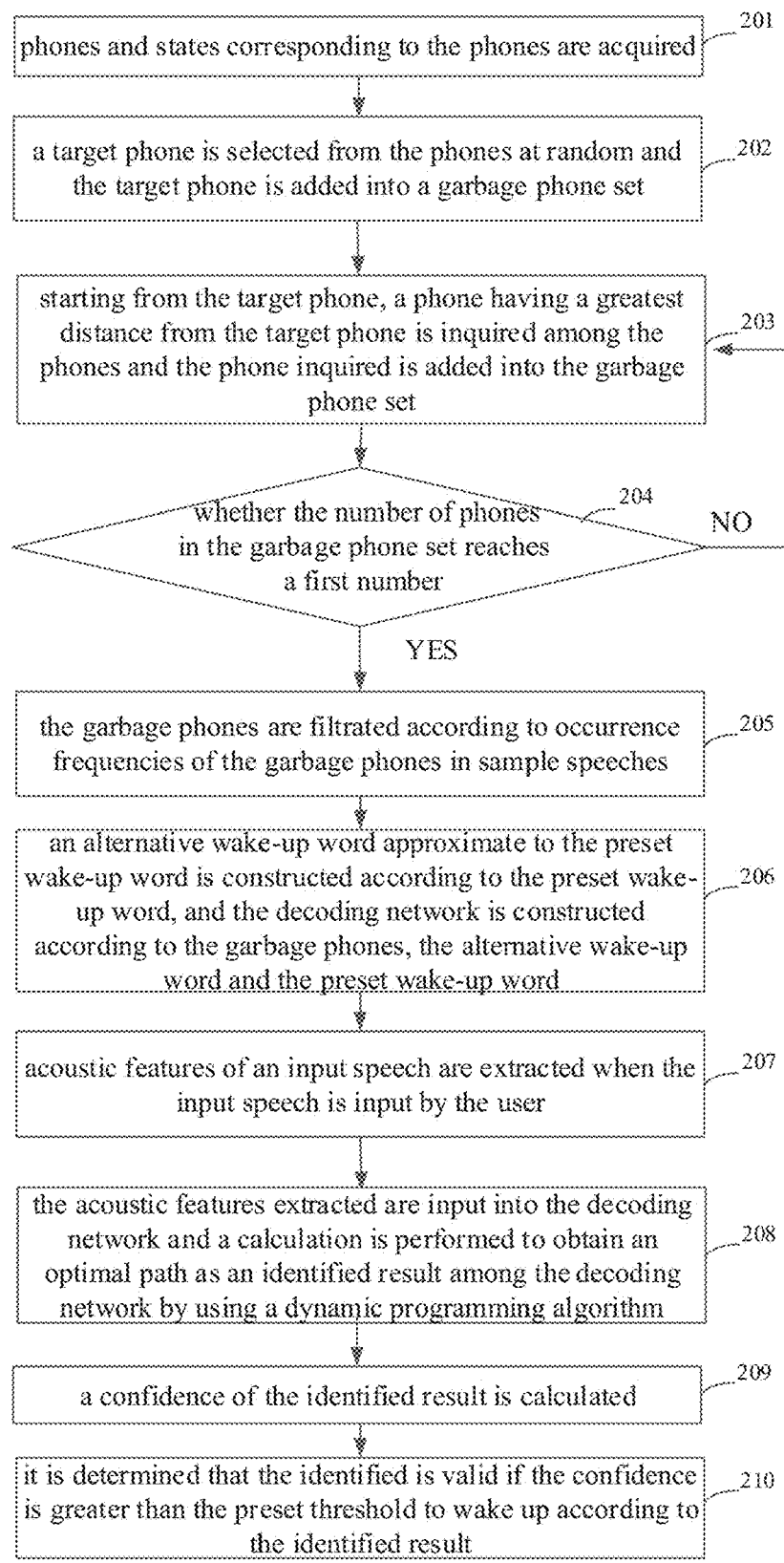
FIG. 3 is a flow chart illustrating another method for waking up via a speech based on artificial intelligence provided in embodiments of the present disclosure.

In order to describe the above embodiment clearly, an embodiment provides another method for waking up via a speech based on artificial intelligence. FIG. 3 is a flow chart illustrating another method for waking up via a speech based on artificial intelligence provided in embodiments of the present disclosure.

As illustrated in FIG. 3, the method includes followings.

At act 201, phones and states corresponding to the phones are acquired.

In detail, for each phone, each state corresponding to the each phone is fitted with a Gaussian Mixture Model to obtain a Gaussian Mixture Model of the each phone. A parameter optimization is performed on the Gaussian Mixture Model obtained with a plurality of speech samples and speech labels. The Gaussian Mixture Models are sequenced according to a similarity among the Gaussian Mixture Models after the parameter optimization, to obtain each phone and each state corresponding to the each phone respectively.

At act 202, a target phone is selected from the phones at random and the target phone is added into a garbage phone set.

At act 203, starting from the target phone, a phone having a greatest distance from the target phone is inquired among the phones and the phone inquired is added into the garbage phone set.

In detail, the distance S between the target phone SM and each phone PN is calculated by a formula of $S=(SM_1-SN_1)^2+(SM_2-SN_2)^2+(SM_3-SN_3)^2$, where $SM_1$, $SM_2$ and $SM_3$ are three states of the target phone PM, and $SN_1$, $SN_2$ and $SN_3$ are three states of the each phone PN. The phone with a maximum S is selected according to the distance S calculated.

At act 204, it is determined whether the number of phones in the garbage phone set reaches a first number, an act 205 is performed if yes, otherwise, the phone inquired is determined as the target phone and the act 203 is performed circularly.

At act 205, the garbage phones are filtrated according to occurrence frequencies of the garbage phones in sample speeches.

In detail, by identifying a plurality of sample speeches with each phone respectively, to obtain sets of matched phones. By sequencing the sets from most to least according to the number of the matched phones, a set having a greatest number of the matched phones is selected as a filtrated set. The garbage phones are filtrated according to the filtrated set to conserve the garbage phones included in the filtrated set.

For example, the garbage phone set is denoted as a set K, and the filtrated set is denoted as a set T. Components included in an intersection of the set K and the set T are determined as the garbage phones.

The garbage phones are constructed by the above acts. The constructing, the filtrating in embodiments optimize the garbage phones, may better distinguish weights of the preset wake-up word and others, may largely avoid waking up via non-wake-up words, may effectively reduce a false alarm rate and may greatly improve user experience. Meanwhile, an accuracy of waking up is higher in the embodiment of the present disclosure. As the garbage phones are used instead of the garbage words, the preset wake-up words and the non-wake-up words input by the user may be better distinguished during the speech recognition with the decoding network. Furthermore, the weights are reasonable, and the false alarm rate of waking up is reduced while the accuracy of waking up is improved.

Furthermore, in an aspect of power consumption, as a parallel connection between the garbage phones and the preset wake-up words, instead of using a total identification system, internal memory is less occupied, such that the internal memory is largely optimized and the power consumption of the terminal is low.

At act 206, an alternative wake-up word approximate to the preset wake-up word is constructed according to the preset wake-up word, and the decoding network is constructed according to the garbage phones, the alternative wake-up word and the preset wake-up word.

A near pronunciation word, having characters with a number smaller than that of the preset wake-up word, is selected from a list of words having similar pronunciation to the preset wake-up word. And the alternative wake-up word is constructed according to a part of the preset wake-up word and the near pronunciation word.

It is to be illustrated that, details of constructing the alternative wake-up word may be referred to descriptions of the above embodiment, which is not elaborated herein.

Figure 4:
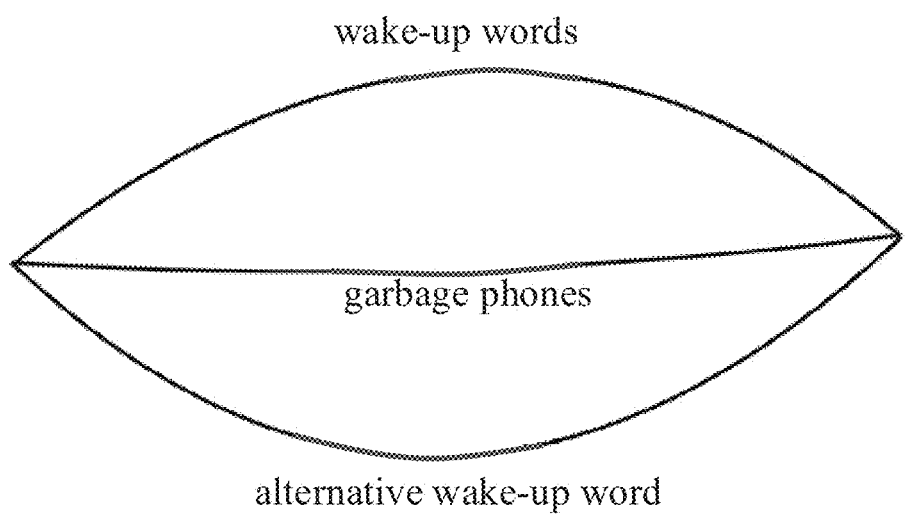
FIG. 4 is a schematic diagram illustrating a decoding network.

The decoding network is constructed according to the garbage phones, the alternative wake-up word and the preset wake-up word. FIG. 4 is a schematic diagram illustrating a decoding network. As illustrated in FIG. 4, the garbage phones, the alternative wake-up word and the preset wake-up word are in parallel.

At act 207, acoustic features of an input speech are extracted when the input speech is input by the user.

In detail, for the input speech, after an end point is identified, the acoustic features are extracted. A specific method for extracting the acoustic features may be referred to relative descriptions of the speech recognition technology in the related art, which is not elaborated herein.

At act 208, the acoustic features extracted are input into the decoding network and a calculation is performed to obtain an optimal path as an identified result among the decoding network by using a dynamic programming algorithm.

In detail, a Viterbi algorithm in common dynamic programming algorithms is used to obtain the optimal path as the identified result among the decoding network.

At act 209, a confidence of the identified result is calculated.

In detail, an average value of the input speech is calculated according to scores of the optimal paths, calculated in the decoding network, corresponding to frames of the input speech. An average value of the preset wake-up word is calculated according to scores of the optimal paths, calculated in the decoding network, corresponding to frames of the preset wake-up word. And it is determined that the identified result is valid if a difference obtained by subtracting the average value of the input speech from the average value of the preset wake-up word is greater than a preset threshold.

For example, firstly, in a process of calculating the identified result by using the dynamic programming algorithm, the score (Score) of each of the frames of the input speech is recorded. When there are q scores of q frames denoted by $Score_1, Score_2 \ldots Score_q$, where $1, 2 \ldots q$ are indexes of the frames of the input speech, the average value of the scores $Score_1, Score_2 \ldots Score_q$ are calculated, denoted by $Score_{Ave}$.

Further, the average value of the scores $Score'_1, Score'_2 \ldots Score'_t$ of the frames of the preset wake-up word is calculated, where $1, 2 \ldots t$ are indexes of the frames of the preset wake-up word. Then, the average value of the preset wake-up word is denoted by ScoreWakeUp.

The confidence ScoreCM is calculated according to an equation $ScoreCM = ScoreWakeUp - Score_{Ave}$.

At act 210, it is determined that the identified is valid if the confidence is greater than the preset threshold to wake up according to the identified result.

The calculating of the confidence may largely avoid waking up via a non-wake-up word, thus reducing a probability of false waking up effectively. As a result, a false alarm rate is reduced.

In embodiments, by clustering the phones to select the garbage phones for representing the phones, and by constructing the decoding network according to the garbage phones, the alternative wake-up word and the preset wake-up word, after the alternative wake-up word approximate to the preset wake-up word is constructed according to the preset wake-up word, the waking up via the speech is performed by using the decoding network. Due to the data size for the garbage phones is significantly smaller than the data size for the garbage words, a problem that the data size occupied is too large by using a garbage word model in the prior art is solved. Meanwhile, as a word is composed of several phones, the garbage phones may be more likely to cover all words than the garbage words. Thus, an accuracy of waking up is improved and a probability of false waking up is reduced.

In order to achieve the above embodiments, the present disclosure further provided a device for waking up a speech based on artificial intelligence.

Figure 5:
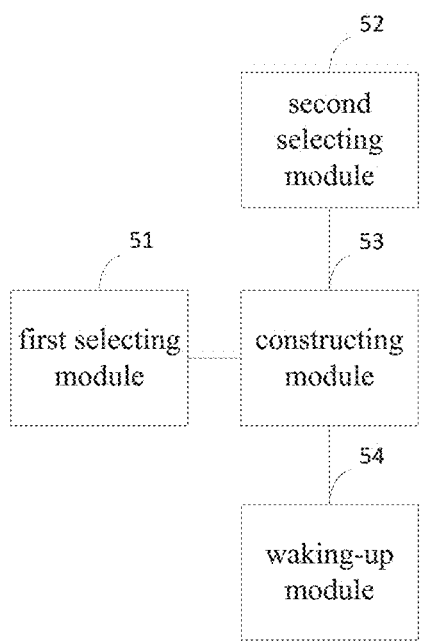
FIG. 5 is a block diagram illustrating a device for waking up via a speech based on artificial intelligence provided in embodiments of the present disclosure.

FIG. 5 is a block diagram illustrating a device for waking up via a speech based on artificial intelligence provided in embodiments of the present disclosure.

As illustrated in FIG. 5, the device includes: a first selecting module 51, a second selecting module 52, a constructing module 53 and a waking-up module 54.

The first selecting module 51 is configured to cluster phones to select garbage phones for representing the phones.

The second selecting module 52 is configured to construct an alternative wake-up word approximate to a preset wake-up word according to the preset wake-up word.

The constructing module 53 is configured to construct a decoding network according to the garbage phones, the alternative wake-up word and the preset wake-up word.

The waking-up module 54 is configured to wake up via the speech by using the decoding network.

Further, as a possible implementation of embodiments of the present disclosure, the second selecting module 52 is specifically configured to select a near pronunciation word having characters with a number smaller than that of the preset wake-up word from a list of words having similar pronunciation to the preset wake-up word; and to combine a part of the preset wake-up word with the near pronunciation word to construct the alternative wake-up word.

It is to be illustrated that, descriptions and explanations of embodiments of the method for waking up via a speech based on artificial intelligence are also suitable for embodiments of the device for waking up via a speech based on artificial intelligence, which is not elaborated herein.

In embodiments, by clustering the phones to select the garbage phones for representing the phones via the first selecting module, and by constructing the decoding network via the constructing module according to the garbage phones, the alternative wake-up word and the preset wake-up word module, after the alternative wake-up word approximate to the preset wake-up word is constructed via the second selecting module according to the preset wake-up word, the decoding network is used to wake up via the speech. Due to the data size for the garbage phones is significantly smaller than the data size for the garbage words, a problem that the data size occupied is too large by using a garbage word model in the prior art is solved. Meanwhile, as a word is composed of several phones, the garbage phones may be more likely to cover all words than the garbage words. Thus, an accuracy of waking up is improved and a probability of false waking up is reduced.

Figure 6:
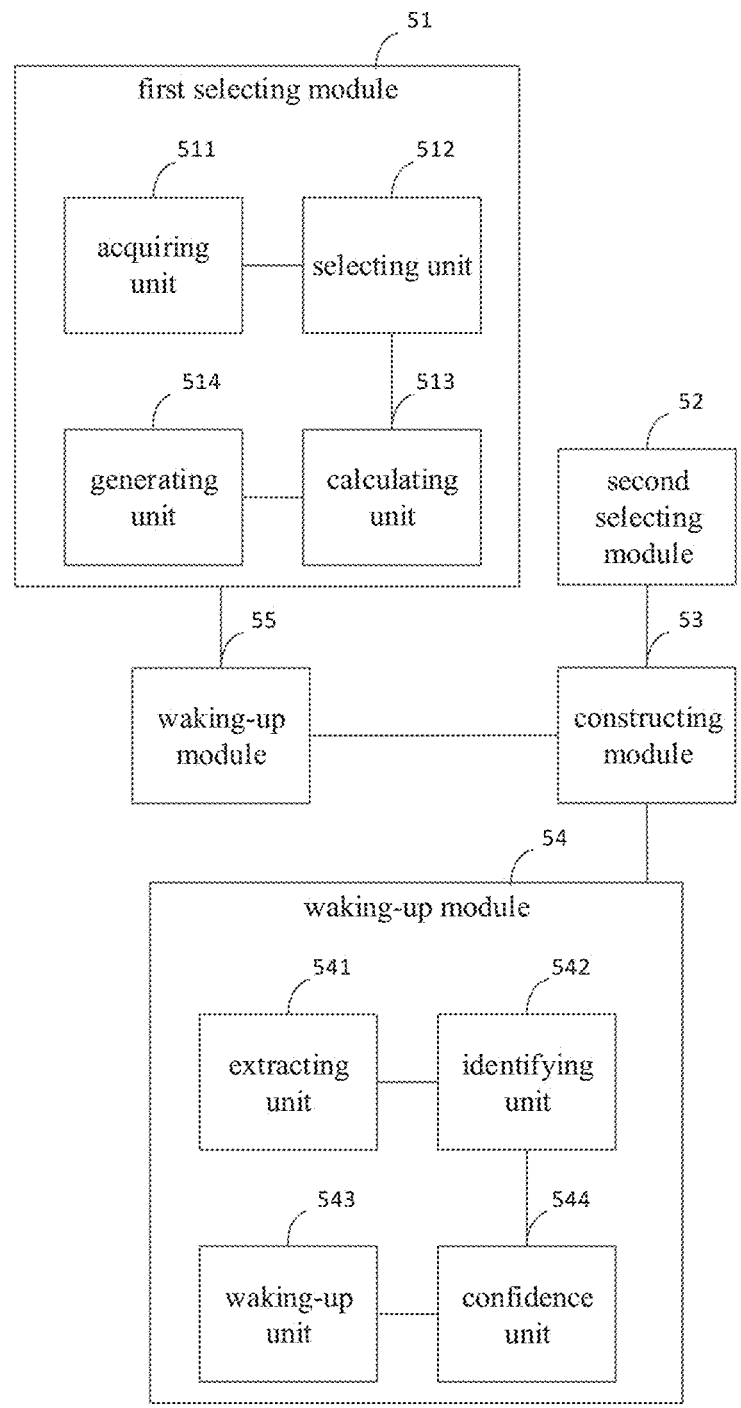
FIG. 6 is a block diagram illustrating another device for waking up via a speech based on artificial intelligence provided in embodiments of the present disclosure.

Based on the above embodiments, embodiments of the present disclosure provide a still another device for waking up via a speech based on artificial intelligence. FIG. 6 is a block diagram illustrating a still another device for waking up via a speech based on artificial intelligence provided in embodiments of the present disclosure. On the basis of the above embodiment, the first selecting module includes: an acquiring unit 511, a selecting unit 512, a calculating unit 513 and a generating unit 514.

The acquiring unit 511 is configured to acquire the phones and states corresponding to the phones.

The selecting unit 512 is configured to select a target phone from the phones at random and to add the target phone into a garbage phone set.

The calculating unit 513 is configured to start from the target phone, to inquire a phone having a greatest distance from the target phone among the phones and to add the phone inquired into the garbage phone set.

The generating unit 514 is configured to take the phone inquired as the target phone, to circularly perform a process of inquiring the phone having a greatest distance from the target phone among the phones and to add the phone inquired into the garbage phone set, until the number of phones in the garbage phone set is a preset first number.

Further, as a possible implementation of embodiments of the present disclosure, the acquired module 511 is specifically configured to fit, for the phones, the states corresponding to the phones with a Gaussian Mixture Model to obtain Gaussian Mixture Models of the phones respectively; to perform a parameter optimization on the Gaussian Mixture Models obtained with a plurality of speech samples and speech labels; and to sequence the Gaussian Mixture Models according to a similarity among parameters optimized of the Gaussian Mixture Models, to obtain the phones and the states corresponding to the phones respectively.

The calculating module 513 is specifically configured to calculate a distance S between the target phone PM and each PN of the phones according to an equation $S=(SM_1-SN_1)^2+(SM_2-SN_2)^2+(SM_3-SN_3)^2$; in which $SM_1$, $SM_2$ and $SM_3$ are three states of the target phone PM respectively, $SN_1$, $SN_2$ and $SN_3$ are three states of the each PN of the phones respectively; and to select the phone with a greatest value of S according to the distance S calculated.

Further, as a possible implementation of embodiments of the present disclosure, the still another device further includes: a filtrating module 55.

The filtrating module 55 is configured to identify a plurality of speech samples with each of the phones respectively to obtain sets of matched phones; to select a set having a greatest number of matched phones as a filtrated set; and to filtrate the garbage phones according to the filtrated set to conserve the garbage phones comprised in the filtrated set.

Further, as a possible implementation of embodiments of the present disclosure, the waking-up module includes: an extracting unit 541, an identifying unit 542, a waking-up unit 543 and a confidence unit 544.

The extracting unit 541 is configured to extract acoustic features of an input speech.

The identifying unit 542 is configured to input the acoustic features extracted into the decoding network and to perform a calculation to obtain an identified result of an optimal path among the decoding network by using a dynamic programming algorithm.

The waking-up unit 543 is configured to wake a terminal up according to the identified result.

The confidence unit 544 is configured to calculate an average value of the input speech according to a score of the optimal path, calculated in the decoding network, corresponding to each frame of the input speech; to calculate an average value of the preset wake-up word according to a score of the optimal path, calculated in the decoding network, corresponding to each frame of the preset wake-up word; and to determine the identified result is valid if a difference by subtracting the average value of the input speech from the average value of the preset wake-up word is greater than a preset threshold.

It is to be illustrated that, descriptions and explanations of embodiments of the method for waking up via a speech based on artificial intelligence are also suitable for embodiments of the device for waking up via a speech based on artificial intelligence, which is not elaborated herein.

In the embodiment, by clustering the phones to select the garbage phones for representing the phones via the first selecting module, and by constructing the decoding network via the constructing module according to the garbage phones, the alternative wake-up word and the preset wake-up word module, after the alternative wake-up word approximate to the preset wake-up word is constructed via the second selecting module according to the preset wake-up word, the decoding network is used to wake up via the speech. Due to the data size for the garbage phones is significantly smaller than the data size for the garbage words, a problem that the data size occupied is too large by using a garbage word model in the prior art is solved. Meanwhile, as a word is composed of several phones, the garbage phones may be more likely to cover all words than the garbage words. Thus, an accuracy of waking up is improved and a probability of false waking up is reduced.

In order to achieve the above objectives, embodiments of the present disclosure further provide another device for waking up via a speech based on artificial intelligence. The device includes: a processor; a memory configured to store instructions executable by the processor.

The processor is configured to: cluster phones to select garbage phones for representing the phones; construct an alternative wake-up word approximate to a preset wake-up word according to the preset wake-up word; construct a decoding network according to the garbage phones, the alternative wake-up word and the preset wake-up word; and wake up via the speech by using the decoding network.

In order to achieve the above objectives, embodiments of the present disclosure further provide a non-transitory computer readable storage medium. When instructions stored in storage medium is executed by a processor of a terminal, a method for waking up via a speech based on artificial intelligence may be executed by the terminal. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network.

In order to achieve the above objectives, embodiments of the present disclosure further provide a computer program product. When instructions in the computer program product are executed by a processor, a method for waking up via a speech is performed. The method includes: clustering phones to select garbage phones for representing the phones; constructing an alternative wake-up word approximate to a preset wake-up word according to the preset wake-up word; constructing a decoding network according to the garbage phones, the alternative wake-up word and the preset wake-up word; and waking up via the speech by using the decoding network.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, alternatives, and modifications can be made in the embodiments by those skilled in the art without departing from scope of the present disclosure.

What is claimed is:

1. A method for waking up via a speech based on artificial intelligence, comprising:
    clustering, by at least one computing device, phones to select garbage phones for representing the phones;
    constructing, by the at least one computing device, an alternative wake-up word approximate to a preset wake-up word according to the preset wake-up word;
    constructing, by the at least one computing device, a decoding network according to the garbage phones, the alternative wake-up word and the preset wake-up word; and
    waking up, by the at least one computing device, based upon a calculated score of the speech performed by the decoding network exceeding a preset threshold.

2. The method according to claim 1, wherein clustering, by the at least one computing device, phones to select garbage phones for representing the phones comprises:
    acquiring, by the at least one computing device, the phones and states corresponding to the phones;
    selecting, by the at least one computing device, a target phone from the phones at random;
    adding, by the at least one computing device, the target phone into a garbage phone set;
    starting, by the at least one computing device, from the target phone, to inquire a phone having a greatest distance from the target phone among the phones and to add the phone inquired into the garbage phone set; and
    taking, by the at least one computing device, the phone inquired as the target phone, to circularly perform a process of inquiring the phone having a greatest distance from the target phone among the phones and adding the phone inquired into the garbage phone set, until the number of phones in the garbage phone set is a preset first number.

3. The method according to claim 2, wherein acquiring, by the at least one computing device, the phones and states corresponding to the phones comprises:
    for the phones, fitting, by the at least one computing device, the states corresponding to the phones with a Gaussian Mixture Model to obtain Gaussian Mixture Models of the phones respectively;
    performing, by the at least one computing device, a parameter optimization on the Gaussian Mixture Models obtained with a plurality of speech samples and speech labels; and
    sequencing, by the at least one computing device, the Gaussian Mixture Models according to a similarity among the Gaussian Mixture Models after the parameter optimization, to obtain the phones and the states corresponding to the phones respectively.

4. The method according to claim 2, wherein starting, by the at least one computing device, from the target phone, to inquire a phone having a greatest distance from the target phone among the phones comprises:
    calculating, by the at least one computing device, a distance S between the target phone PM and each PN of the phones according to an equation $S=(SM_1-SN_1)^2+(SM_2-SN_2)^2+(SM_3-SN_3)^2$; wherein $SM_1$, $SM_2$ and $SM_3$ are three states of the target phone PM respectively, $SN_1$, $SN_2$ and $SN_3$ are three states of the each PN of the phones respectively; and
    selecting, by the at least one computing device, the phone with a greatest value of S according to the distance S calculated.

5. The method according to claim 1, wherein after clustering, by at least one computing device, phones to select garbage phones for representing the phones, the method further comprises:
    identifying, by the at least one computing device, a plurality of speech samples with each of the phones respectively to obtain sets of matched phones;

selecting, by the at least one computing device, a set having a greatest number of matched phones as a filtrated set; and filtrating, by the at least one computing device, the garbage phones according to the filtrated set to conserve the garbage phones comprised in the filtrated set.

6. The method according to claim 1, wherein constructing, by the at least one computing device, an alternative wake-up word approximate to a preset wake-up word according to the preset wake-up word comprises:

selecting, by the at least one computing device, a near pronunciation word having characters with a number smaller than that of the preset wake-up word from a list of words having similar pronunciation to the preset wake-up word; and combining, by the at least one computing device, a part of the preset wake-up word with the near pronunciation word to construct the alternative wake-up word.

7. The method according to claim 1, wherein waking up, by the at least one computing device, via the speech by the decoding network comprises:

extracting, by the at least one computing device, acoustic features of an input speech;

inputting, by the at least one computing device, the acoustic features extracted into the decoding network;

performing, by the at least one computing device, a calculation to obtain an identified result of an optimal path among the decoding network by using a dynamic programming algorithm; and waking, by the at least one computing device, a terminal up according to the identified result.

8. The method according to claim 7, after performing, by the at least one computing device, a calculation to obtain an identified result of an optimal path among the decoding network, further comprising:

calculating, by the at least one computing device, an average value of the input speech according to a score of the optimal path, calculated in the decoding network, corresponding to each frame of the input speech;

calculating, by the at least one computing device, an average value of the preset wake-up word according to a score of the optimal path, calculated in the decoding network, corresponding to each frame of the preset wake-up word; and determining, by the at least one computing device, the identified result is valid if a difference by subtracting the average value of the input speech from the average value of the preset wake-up word is greater than the preset threshold.

9. A device for waking up via a speech based on artificial intelligence, comprising:

a processor;

a memory configured to store instructions executable by the processor, wherein the processor is configured to:

cluster phones to select garbage phones for representing the phones;

construct an alternative wake-up word approximate to a preset wake-up word according to the preset wake-up word;

construct a decoding network according to the garbage phones, the alternative wake-up word and the preset wake-up word; and wake up based upon a calculated score of the speech performed by the decoding network exceeding a preset threshold.

10. The device according to claim 9, wherein the processor is configured to cluster phones to select garbage phones for representing the phones by acts of:

acquiring the phones and states corresponding to the phones;

selecting a target phone from the phones at random;

adding the target phone into a garbage phone set;

starting from the target phone, to inquire a phone having a greatest distance from the target phone among the phones and to add the phone inquired into the garbage phone set; and taking the phone inquired as the target phone, to circularly perform a process of inquiring the phone having a greatest distance from the target phone among the phones and adding the phone inquired into the garbage phone set, until the number of phones in the garbage phone set is a preset first number.

11. The device according to claim 10, wherein the processor is configured to acquire the phones and states corresponding to the phones by acts of:

for the phones, fitting the states corresponding to the phones with a Gaussian Mixture Model to obtain Gaussian Mixture Models of the phones respectively;

performing a parameter optimization on the Gaussian Mixture Models obtained with a plurality of speech samples and speech labels; and sequencing the Gaussian Mixture Models according to a similarity among the Gaussian Mixture Models after the parameter optimization, to obtain the phones and the states corresponding to the phones respectively.

12. The device according to claim 10, wherein the processor is configured to start from the target phone, to inquire a phone having a greatest distance from the target phone among the phones by acts of:

calculating a distance S between the target phone PM and each PN of the phones according to an equation $S=(SM_1-SN_1)^2+(SM_2-SN_2)^2+(SM_3-SN_3)^2$; wherein $SM_1$, $SM_2$ and $SM_3$ are three states of the target phone PM respectively, $SN_1$, $SN_2$ and $SN_3$ are three states of the each PN of the phones respectively; and selecting the phone with a greatest value of S according to the distance S calculated.

13. The device according to claim 9, wherein the processor is further configured to:

identify a plurality of speech samples with each of the phones respectively to obtain sets of matched phones;

selecting a set having a greatest number of matched phones as a filtrated set; and filtrating the garbage phones according to the filtrated set to conserve the garbage phones comprised in the filtrated set.

14. The device according to claim 9, wherein the processor is configured to construct an alternative wake-up word approximate to a preset wake-up word according to the preset wake-up word by acts of:

selecting a near pronunciation word having characters with a number smaller than that of the preset wake-up word from a list of words having similar pronunciation to the preset wake-up word; and combining a part of the preset wake-up word with the near pronunciation word to construct the alternative wake-up word.

15. The device according to claim 9, wherein the processor is configured to wake up via the speech by the decoding network by acts of:
- extracting acoustic features of an input speech;
- inputting the acoustic features extracted into the decoding network;
- performing a calculation to obtain an identified result of an optimal path among the decoding network by using a dynamic programming algorithm; and
- waking a terminal up according to the identified result.

16. The device according to claim 15, wherein the processor is further configured to:
- calculate an average value of the input speech according to a score of the optimal path, calculated in the decoding network, corresponding to each frame of the input speech;
- calculate an average value of the preset wake-up word according to a score of the optimal path, calculated in the decoding network, corresponding to each frame of the preset wake-up word; and
- determine the identified result is valid if a difference by subtracting the average value of the input speech from the average value of the preset wake-up word is greater than the preset threshold.

17. A non-transitory computer readable storage medium comprising instructions, wherein when the instructions are executed by a processor of a device to perform acts of:
- clustering phones to select garbage phones for representing the phones;
- constructing an alternative wake-up word approximate to a preset wake-up word according to the preset wake-up word;
- constructing a decoding network according to the garbage phones, the alternative wake-up word and the preset wake-up word; and
- waking up based upon a calculated score of the speech performed by the decoding network exceeding a preset threshold.

18. The non-transitory computer readable storage medium according to claim 17, wherein clustering phones to select garbage phones for representing the phones comprises:
- acquiring the phones and states corresponding to the phones;
- selecting a target phone from the phones at random;
- adding the target phone into a garbage phone set;
- starting from the target phone, to inquire a phone having a greatest distance from the target phone among the phones and to add the phone inquired into the garbage phone set; and
- taking the phone inquired as the target phone, to circularly perform a process of inquiring the phone having a greatest distance from the target phone among the phones and adding the phone inquired into the garbage phone set, until the number of phones in the garbage phone set is a preset first number.

19. The non-transitory computer readable storage medium according to claim 18, wherein acquiring the phones and states corresponding to the phones comprises:
- for the phones, fitting the states corresponding to the phones with a Gaussian Mixture Model to obtain Gaussian Mixture Models of the phones respectively;
- performing a parameter optimization on the Gaussian Mixture Models obtained with a plurality of speech samples and speech labels; and
- sequencing the Gaussian Mixture Models according to a similarity among the Gaussian Mixture Models after the parameter optimization, to obtain the phones and the states corresponding to the phones respectively.

20. The non-transitory computer readable storage medium according to claim 18, wherein starting from the target phone, to inquire a phone having a greatest distance from the target phone among the phones comprises:
- calculating a distance S between the target phone PM and each PN of the phones according to an equation $S=(SM_1-SN_1)^2+(SM_2-SN_2)^2+(SM_3-SN_3)^2$; wherein $SM_1$, $SM_2$ and $SM_3$ are three states of the target phone PM respectively, $SN_1$, $SN_2$ and $SN_3$ are three states of the each PN of the phones respectively; and
- selecting the phone with a greatest value of S according to the distance S calculated.

* * * * *